(12) United States Patent
Parry et al.

(10) Patent No.: US 8,051,131 B2
(45) Date of Patent: Nov. 1, 2011

(54) E-MAIL ADDRESSING AND DOCUMENT MANAGEMENT

(75) Inventors: Travis J. Parry, Boise, ID (US); Roger S. Twede, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2245 days.

(21) Appl. No.: 10/171,276

(22) Filed: Jun. 12, 2002

(65) Prior Publication Data

US 2003/0233411 A1    Dec. 18, 2003

(51) Int. Cl.
*G06F 15/16* (2006.01)

(52) U.S. Cl. .................................. 709/206; 709/246

(58) Field of Classification Search .................. 709/206, 709/207, 246; 710/33
See application file for complete search history.

(56) References Cited

U.S. PATENT DOCUMENTS

| | | | |
|---|---|---|---|
| 5,483,653 A | 1/1996 | Furman | |
| 5,822,526 A * | 10/1998 | Waskiewicz | 709/206 |
| 5,995,723 A | 11/1999 | Sperry et al. | |
| 6,031,623 A | 2/2000 | Smith et al. | |
| 6,052,198 A | 4/2000 | Neuhard et al. | |
| 6,230,188 B1 * | 5/2001 | Marcus | 709/206 |
| 6,411,685 B1 * | 6/2002 | O'Neal | 379/88.14 |
| 6,614,551 B1 * | 9/2003 | Peek | 358/1.15 |
| 6,625,642 B1 * | 9/2003 | Naylor et al. | 709/206 |
| 6,750,982 B1 | 6/2004 | Takaira et al. | |
| 6,801,935 B2 * | 10/2004 | Shen | 709/219 |
| 2001/0044785 A1 * | 11/2001 | Stolfo et al. | 705/74 |
| 2002/0016818 A1 * | 2/2002 | Kirani et al. | 709/203 |
| 2002/0191210 A1 * | 12/2002 | Staas et al. | 358/1.15 |
| 2004/0186925 A1 * | 9/2004 | Cooper et al. | 710/8 |
| 2004/0196492 A1 * | 10/2004 | Johnson et al. | 358/1.15 |
| 2005/0009560 A1 * | 1/2005 | Cavill et al. | 455/556.1 |
| 2005/0010641 A1 * | 1/2005 | Staack | 709/206 |
| 2005/0086315 A1 * | 4/2005 | Malik et al. | 709/206 |

* cited by examiner

*Primary Examiner* — David Lazaro

(57) ABSTRACT

A method and system for managing and manipulating documents sent via e-mail wherein dedicated e-mail addresses associated with daemons, or other programming code, are used to direct the functions carried out on the documents, such as printing, storing, or posting to an Internet file, portions of an e-mail message or attachments.

13 Claims, 5 Drawing Sheets

E-MAIL ADDRESSING AND DOCUMENT MANAGEMENT

FIELD OF THE INVENTION

The present invention generally relates to methods and systems for managing and manipulating electronically stored documents. More particularly, the present invention provides a method and system for storing, distributing, managing and manipulating documents using dedicated e-mail addresses or interactive web pages.

BACKGROUND OF THE INVENTION

Storage, distribution, and manipulation of data and information are common tasks associated with computer usage. Businesses frequently use computers to perform many tasks, including data storage, calculations, document creation, communications and the like. Similarly, more and more personal computer users rely extensively on computers to keep track of financial records, to manage personal documents, to surf the Internet and as communication tools.

Sending, receiving, and composing e-mail has become one of the primary uses for computers in our society. Over the past decade, use of e-mail for business, academic, and personal communications has skyrocketed. Many computer users have one or more e-mail addresses for receiving e-mail for business or personal reasons.

The use of e-mail for sending information generally involves the steps of addressing an e-mail to one or more intended recipients, composing the body of the e-mail, and possibly adding one or more attachments to the e-mail. An addressed e-mail may then be sent to the intended recipient. Upon receipt of an e-mail, a user may view the e-mail on a display device or print the e-mail to a connected printer for hardcopy reading. Other functions, such as forwarding, responding and the like may also be included as features found with a program for handling e-mail communications.

Typically, an e-mail address consists of two parts: a username and a hostname or domain name. The two parts of the e-mail address are separated by the symbol @. The username portion of an e-mail address designates the specific user's mailbox to which the e-mail should be directed. The host/domain name specifies the name of a host on the network providing an e-mail server for handling, sorting, and delivering e-mail messages. For example, the e-mail address "id001@deviceone.com" is routed to a network associated with the domain address "deviceone.com." Once the network is found, the existence of a person or device associated with the identifier "id001" is searched for. If the identified person or device exists, the e-mail is delivered to the inbox for the entity identified as "id001." The use of identifiers and domain name addresses for delivering e-mail messages is well known and further explanation thereof is omitted.

Use of the Internet is also continuing to expand. As the number of people surfing the Internet increases, the number of companies, organizations, and individuals creating web pages also increase. Some of the new web pages being created include personal web pages used by individuals to post personal information to the Internet. Others belong to small businesses wishing to attempt to get ahead and expand their sales base using the Internet. However, many people are unfamiliar with the programming skills necessary to program web pages in an efficient manner. Furthermore, many people will never post information to an Internet viewable location unless, and until, easy methods for accomplishing such posting are developed.

As the expansion of e-mail and Internet use continues, more and more individuals will begin to use these technologies. Already, the use of e-mail is becoming a preferred communication technique. The time consuming steps required for archiving e-mail messages, or converting information to Internet viewable format, are increasing as more people begin to use these technologies. Thus, a convenient and simple method and system for managing e-mail documents, including a method for posting information to the Internet, may be desirable.

SUMMARY OF THE INVENTION

In one embodiment of the present invention dedicated e-mail addresses are used to receive e-mail and print portions of the e-mail. Multiple e-mail addresses may be defined wherein each e-mail address may be dedicated to printing only a certain portion of an e-mail. For instance, one e-mail address may be used to receive e-mails and print the body of the e-mail. Another e-mail address may be used to receive e-mail in which only the attachments to the e-mail are to be printed. A printer daemon, or similar programming, associated with the dedicated e-mail addresses may be used to strip the desired portion of a received e-mail and send that portion to a printer or print function for printing. The printer daemon and the associated e-mail addresses may be hosted by a printer or by another computing device.

In another embodiment of the present invention, dedicated e-mail addresses are used to save portions of an e-mail. As with the previously described embodiment, the present embodiment includes a daemon, or similar programming, for determining what portions of a received e-mail are to be saved to a storage device. Depending upon the e-mail address to which an e-mail is sent, the daemon may strip certain portions of the e-mail from the entire message and save those portions to a predefined or dynamically defined location. For instance, an e-mail address may be configured for receiving e-mails with attachments where the user only wants to save the attachments. Once the e-mail is received, the daemon strips the attachments from the e-mail and saves the attachments. The path and filename to which the attachments are saved may be predefined or defined by the e-mail. For example, the subject line of an e-mail sent to an e-mail address for saving attachments may include the path and file name to which the attachments are to be saved. Alternatively, the path and file name may be designated by a tag, or other identifying indicia, located in the body of the e-mail.

In another embodiment of the present invention, dedicated e-mail addresses, combined with a post daemon, may be used to automatically post information from an e-mail to a file that may be accessed and viewed from the Internet. Similar to the previous embodiments, the amount of information from an e-mail that is posted depends upon the e-mail address to which the e-mail is sent. Various e-mail addresses may be established to post different portions of an e-mail to a file for viewing on the Internet. Once an e-mail is received, the post daemon may post the required information to the necessary file. The file name to which the information is to be posted may be predefined according to the e-mail address to which the e-mail was sent, may be defined in the Subject line of the e-mail, or may be defined by indicia in the e-mail. Upon receipt, the post daemon determines the path and file name for posting and posts the necessary information at that location.

In addition, the post daemon may convert the information stripped from an e-mail for posting into an Internet readable format before saving the information to a file that may be viewed over the Internet. In those instances where the information stripped by the post daemon is not in an Internet compatible format the post daemon may convert the information to an Internet compatible format using various programming codes. Such conversions are known.

In yet another embodiment of the present invention, all of the features of the present invention may be combined and a user-friendly interface provided for facilitating the use of the present invention. The user-friendly interface allows a user to use the invention without being forced to memorize hundreds of e-mail addresses used to perform the various functions associated with the present invention. This is particularly useful in those situations where the user is operating in an enterprise environment.

The term "daemon" as used herein means and includes processes or programming operating behind or with the operating system of a computing device for performing tasks for the operating system as known in the art. Although various operating systems use different names or terms for daemon processes and programming, the term daemon as used herein includes such processes and programming.

DESCRIPTION OF THE DRAWINGS

While the specification concludes with claims particularly pointing out and distinctly claiming that which is regarded as the present invention, the present invention can be more readily ascertained from the following description of embodiments of the invention when read in conjunction with the accompanying drawings in which:

DETAILED DESCRIPTION OF THE INVENTION

Figure 1:
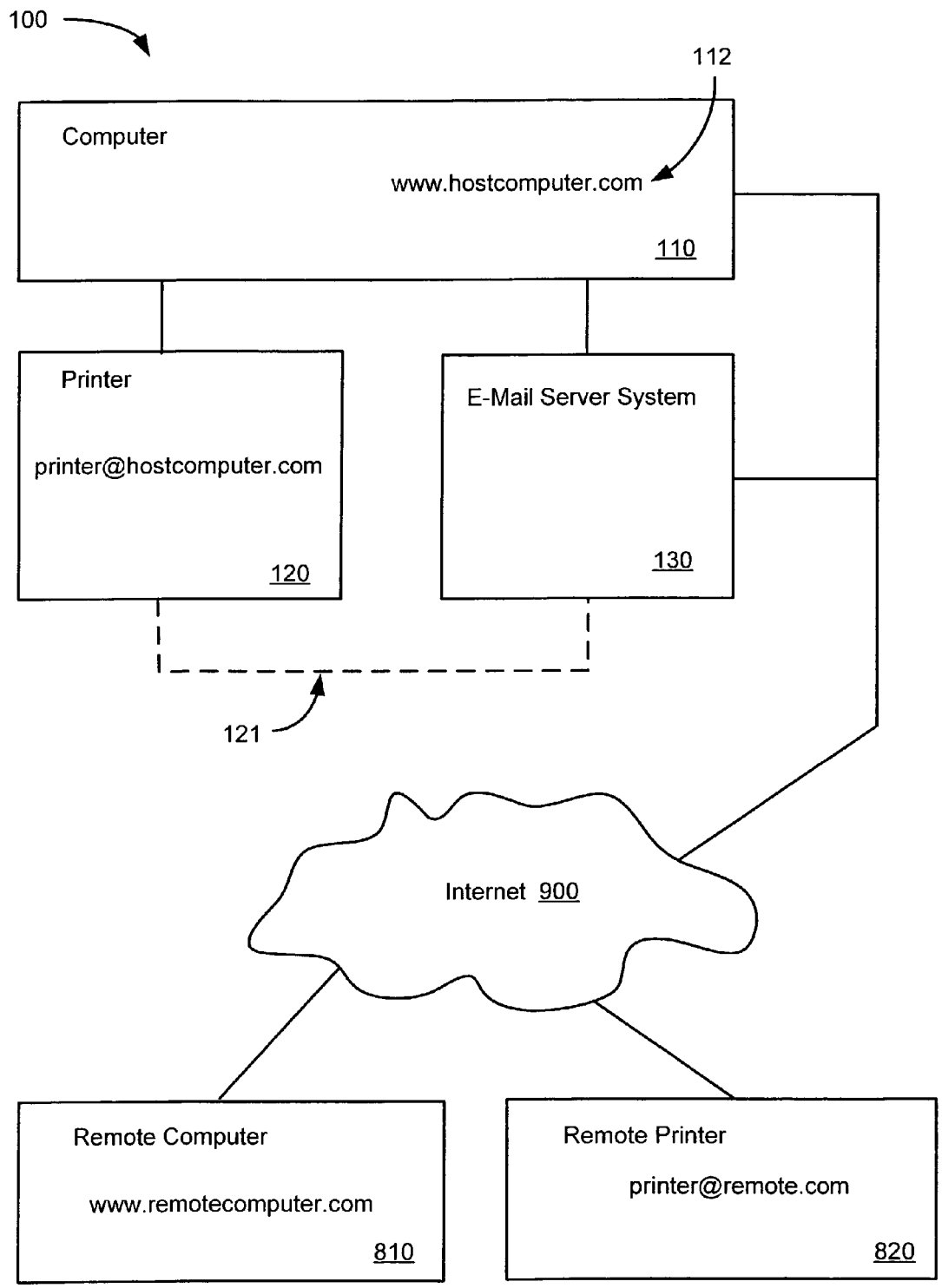
FIG. 1 illustrates a system for carrying out the various embodiments of the present invention.

The components of a system 100 that may be used to carry out the various aspects of the present invention are illustrated in FIG. 1. A computer 110 capable of sending, and optionally receiving, e-mail may be attached to, or in communication with, a printer 120, the Internet 900, or other devices (not shown) typically associated with computers or network computer systems. Computer 110 typically includes the capability for storing and executing one or more computer programs for performing e-mail related tasks. For instance, programs such as GroupWise® by Novell® or Microsoft Outlook® by Microsoft® may be used to compose, send, receive and store e-mail communications. Communications between computer 110 and printer 120 may be performed using communications techniques commonly associated with computer systems, such as by electronic transfers using serial cables, parallel cables or the like. Communications between computer 110 and the Internet 900 may be by modem, cable, fiber optic, or other communication link known in the art. System 100 may also include other devices, such as remote computer 810 and remote printer 820, linked to the Internet 900.

Computer 110 may also include a memory (not shown) for storing data, especially for storing data that may be associated with web pages. Typically, web page data is stored on a computer associated with the Internet 900. Remote users may connect with the computer via the Internet 900 to retrieve or view the data hosted by a computer. For example, computer 110 may host web page data for access by remote users using a web browser, or other program, capable of retrieving and displaying data in an Internet 900 based format. Web page data may be stored in a memory of computer 110 in HTML, SMTL, XML, Java or other format compatible with, or typically used with, the Internet 900 or web browsing programs. Computer 110 may also be associated with a Uniform Resource Locator (URL) address for Internet 900 identification. For example, the URL address 112 "www.hostcomputer.com" may be associated with computer 110 as shown in FIG. 1.

Printer 120 may be connected to computer 110 using any communication methods as known. Alternatively, printer 120 may be e-mail enabled and connected to an e-mail server system 130 associated with computer 110 as illustrated by optional communications link 121. If printer 120 is e-mail enabled, one or more e-mail addresses may be assigned to printer 120 for receiving e-mail. For instance, printer 120 may be associated with the e-mail address "printer@hostcomputer.com." E-mails received by e-mail server system 130 addressed to "printer@hostcomputer.com" are routed to printer 120 by the e-mail server system 130. Printer 120 may also include a memory or access to one or more storage devices for storing e-mail messages.

Optional e-mail server system 130 may be one of any types of computer systems for receiving, routing and directing e-mail communications. E-mail server system may include a memory and/or storage devices for storing e-mail messages for designated e-mail addresses until such time as the e-mail messages are retrieved. Use of e-mail server systems 130 such as that which may be included with the present invention are well known and may be adapted accordingly to carry out the various embodiments of the present invention.

Computer 810 may include e-mail capabilities similar to those of computer 110. Computer 810 may also be associated with a URL address 812 such as "www.remotecomputer.com." Computers 110 and 810 may communicate using e-mail or Internet 900 connections as known in the art.

Printer 820 may also include e-mail capabilities. In other words, printer 820 may include a print server system or software and other programming for receiving, sending, and storing e-mail messages. For example, printer 820 may be associated with an e-mail address "printer@remote.com" for receiving e-mail addressed to that e-mail address. E-mail sent to the address associated with "printer@remote.com" will be routed to printer 820 by an e-mail server system associated with the URL address "www.remote.com" (not shown). In addition, printer 820 may also include one or more memories for storing data or e-mail messages.

The various embodiments of the present invention may be adapted to operate with a system similar to that described with reference to FIG. 1. Using the present invention, document management capabilities may be automated and improved.

One embodiment of the present invention comprises the use of designated e-mail addresses to perform various document management and document printing tasks. An e-mail that a user desires to print may be sent to a specific e-mail address to invoke an automatic print routine. Similarly, if the attachments to an e-mail are to be printed, the e-mail may be sent to an alternate e-mail address to invoke a routine for automatically printing the attachments. The present invention, therefore, may be used to automatically create a hard copy of an e-mail or attachments thereto.

Occasionally, it is important to make a hardcopy of an e-mail being sent to another individual. A hard copy—typically a paper copy—may be needed for a file or for other archival purposes. Using e-mail systems currently available, a user must typically send the e-mail, reopen the sent e-mail, and instruct the e-mail program being used to print a copy of the e-mail. Similarly, if the e-mail contains attachments that the user wishes to print, the user must typically reopen the sent e-mail and instruct a printer to print the attachments. For example, using the system illustrated in FIG. 1, a user of computer 110 may send an e-mail to a user of computer 810 at e-mail address "user1@remotecomputer.com" using a standard e-mail software package. To make a hard copy of the sent e-mail, the user of computer 110 must re-open the sent e-mail and instruct printer 120 to print a copy of the sent e-mail. Although the steps of opening the sent e-mail and instructing printer 120 to print the sent e-mail are not time consuming for a single instance, when performed hundreds of times a day these steps are time consuming, resulting in a loss of productivity. This may be especially true in enterprise environments where multiple e-mails are sent, and printed, by multiple users.

Using the present invention, however, the additional steps required to produce a hardcopy of the e-mail may be avoided. The present invention incorporates an e-mail address with a printer such that a user may directly send, or carbon copy, an e-mail to the printer for automatic printing. For example, the system 100 illustrated in FIG. 1 includes printer 120 associated with the e-mail address "printer@hostcomputer.com." Using the present invention, printer 120 may automatically print any e-mail sent to the e-mail address "printer@hostcomputer.com". Therefore, a user desiring to print a copy of an e-mail may send the e-mail to the printer 120 e-mail address, "printer@hostcomputer.com," to create a hard copy of the e-mail. When sending an e-mail to multiple parties, a carbon copy may be sent to the printer e-mail address for printing the e-mail. By carbon copying printer 120 with the e-mail message, the user need not reopen the sent message for printing, thus saving time.

The present invention accomplishes the automatic printing of an e-mail sent to the e-mail address associated with printer 120 using a printer daemon stored, or accessible to, printer 120. The e-mail address of printer 120 may be associated with a printer daemon, or set of programming codes, for carrying out the embodiments of the present invention. The printer daemon may include programming codes or scripts for initiating a print command to printer 120 similar to that which a user may have invoked after re-opening a sent e-mail. A daemon may be structured such that when printer 120 receives an e-mail addressed to "printer@hostcomputer.com," or other designated e-mail address, printer 120 automatically prints the e-mail message.

Similarly, e-mails with attachments may also be sent to a specific e-mail address associated with printer 120 for printing the attachments to an e-mail. Printer 120 may be associated with multiple e-mail addresses for receiving and printing various portions of e-mails. For instance, a specific e-mail address associated with printer 120 may be created for receiving e-mails having attachments and printing the received attachments. When an e-mail with one or more attachments is received at the specified e-mail address, the printer daemon strips attachments from the e-mail message and prints them. For example, an e-mail address, "printattach@hostcomputer.com," may be associated with printer 120 for printing only attachments to e-mails sent to the associated e-mail address. A user desiring to print just the attachments to an e-mail may include the e-mail address "printattach@hostcomputer.com" as an e-mail address or a carbon copy address of an e-mail. Directed to printer 120, the printer daemon strips the attachments and automatically prints the attachments from the e-mail.

Furthermore, an e-mail address associated with printer 120 may be set-up to print both the e-mail message and any attachments to the e-mail. For example, the e-mail address "printmailatt@hostcomputer.com" may be assigned to print both the e-mail and any attachments to the e-mail. A user desiring to print an e-mail and any attachments thereto may include a designated e-mail address for printing the e-mail and attachments as a sent-to address or in a carbon copy address list of the e-mail.

The present invention may also be used to print a received e-mail. A user receiving an e-mail that they wish to print may forward the e-mail to a designated e-mail address associated with printer 120 for printing. The printer daemon may strip the forwarding information and print the forwarded e-mail message for the user.

Automatic printing of an e-mail by printer 120 is not limited to e-mails sent by a computer 110 associated with the printer. Any e-mail sent to an address designated for printing and associated with printer 120 will be printed. For instance, a user of computer 810 may send an e-mail to printer 120 from a remote location for printing by printer 120. To print the e-mail, the user of computer 810 could address an e-mail to "printer@hostcomputer.com." Use of this embodiment may be advantageous in those instances where a user is traveling but still wishes to print a copy of an e-mail at a home office.

Figure 2:
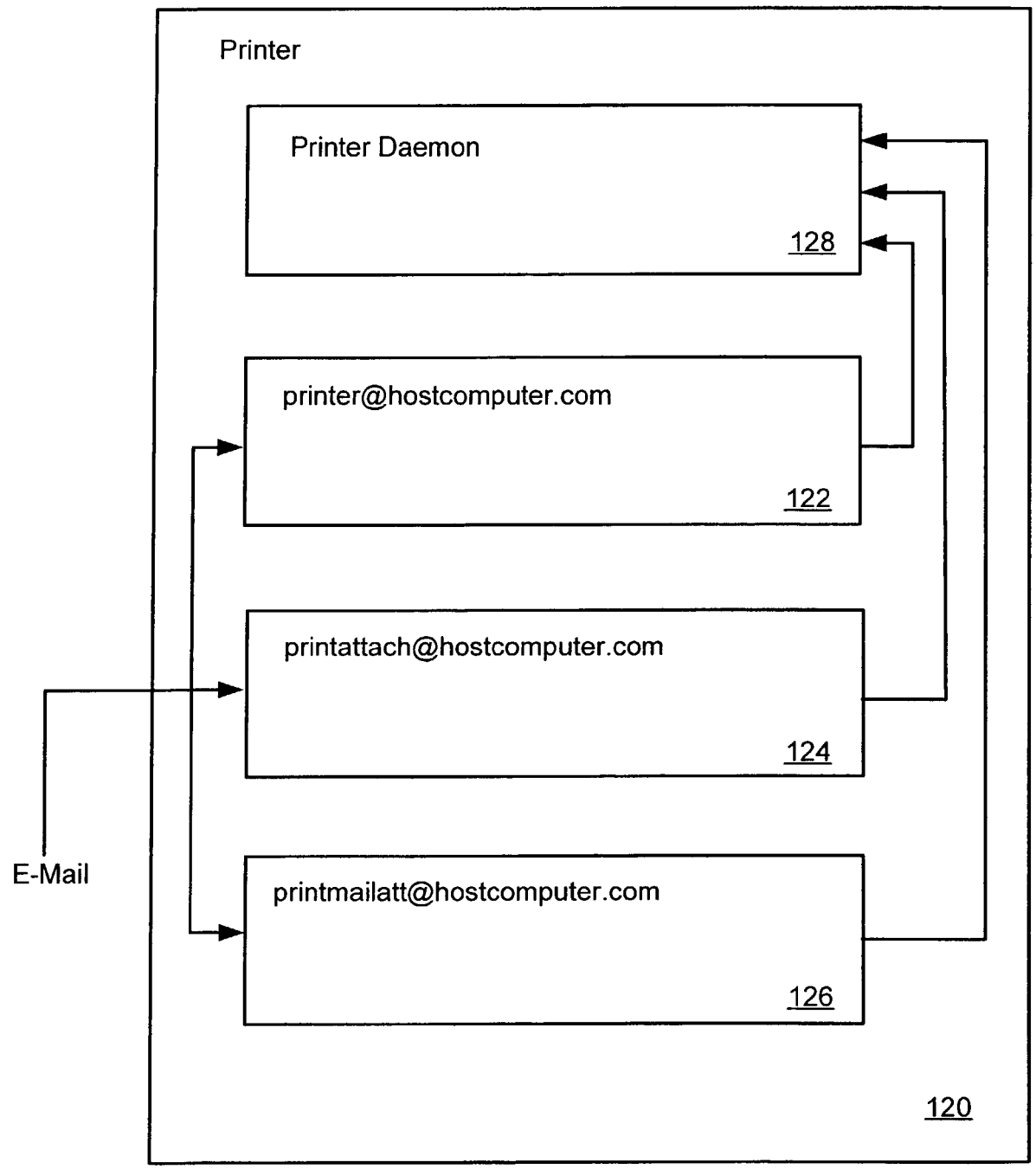
FIG. 2 illustrates a block diagram of an e-mail enabled printer capable of carrying out the various embodiments of the present invention.

A block diagram of a printer 120 incorporating the e-mail and e-mail attachment printing capabilities of the present invention is illustrated in FIG. 2. Printer 120 includes an e-mail address for printing e-mail messages 122, an e-mail address for printing e-mail attachments 124, and an e-mail address for printing both the e-mail and e-mail attachments 126. The associated e-mail addresses for each of the printing options are "printer@hostcomputer.com," "printattach@hostcomputer.com," and "printmailatt@hostcomputer.com," respectively.

Upon receiving an e-mail at one of the e-mail addresses associated with printer 120, the e-mail and any attachments are passed to a printer daemon 128. The printer daemon 128 includes the necessary programming to perform the various printing tasks associated with the specific e-mail addresses of printer 120. Printer daemon 128 manipulates a received e-mail based upon the e-mail address to which the e-mail was sent. Printer daemon 128 strips the necessary information from an e-mail received by one of the three printer 120 e-mail addresses and prints the desired information. For example, a user who wishes to only print a hardcopy of the body of an e-mail, without any accompanying attachments, may send the e-mail to the address "printer@hostcomputer.com" 122. Once received, the e-mail is passed to the printer daemon 128. Based upon the e-mail address to which the e-mail was sent, the printer daemon 128 determines that only the body of the e-mail needs to be printed and therefore instructs printer 120 to only print the body of the e-mail. In other words, the printer daemon 128 strips the body of the e-mail from the e-mail message received and passes the body of the e-mail to a print function associated with the printer 120. Similarly, if the e-mail and any accompanying attachments had been sent to the e-mail address "printmailatt@hostcomputer.com" 126, printer daemon 128 would instruct printer 120 to print both the body of the e-mail along with any attachments to that e-mail.

In an alternate embodiment of the present invention, a designated e-mail address may be used for the automatic filing, or storage, of an electronic copy of a document. Depending upon the e-mail address to which an e-mail is sent, this embodiment of the present invention automatically stores electronic copies of the e-mail and/or attachments to a storage device. The location for storage, name of the stored file, and other information may be predefined, or set by various components included within an e-mail message sent to the storage e-mail address.

Similar to the selective printing embodiment of the present invention, portions of an e-mail may be selectively stored or filed by sending those portions that are to be saved to a predefined e-mail address. Separate e-mail addresses for saving and storing the body of an e-mail, attachments to an e-mail, or the body and attachments of an e-mail may be designated and used to control storage of the desired information. Using this embodiment of the present invention, portions of an e-mail may be automatically saved, providing a more efficient, and time saving, document management system.

Figure 3:
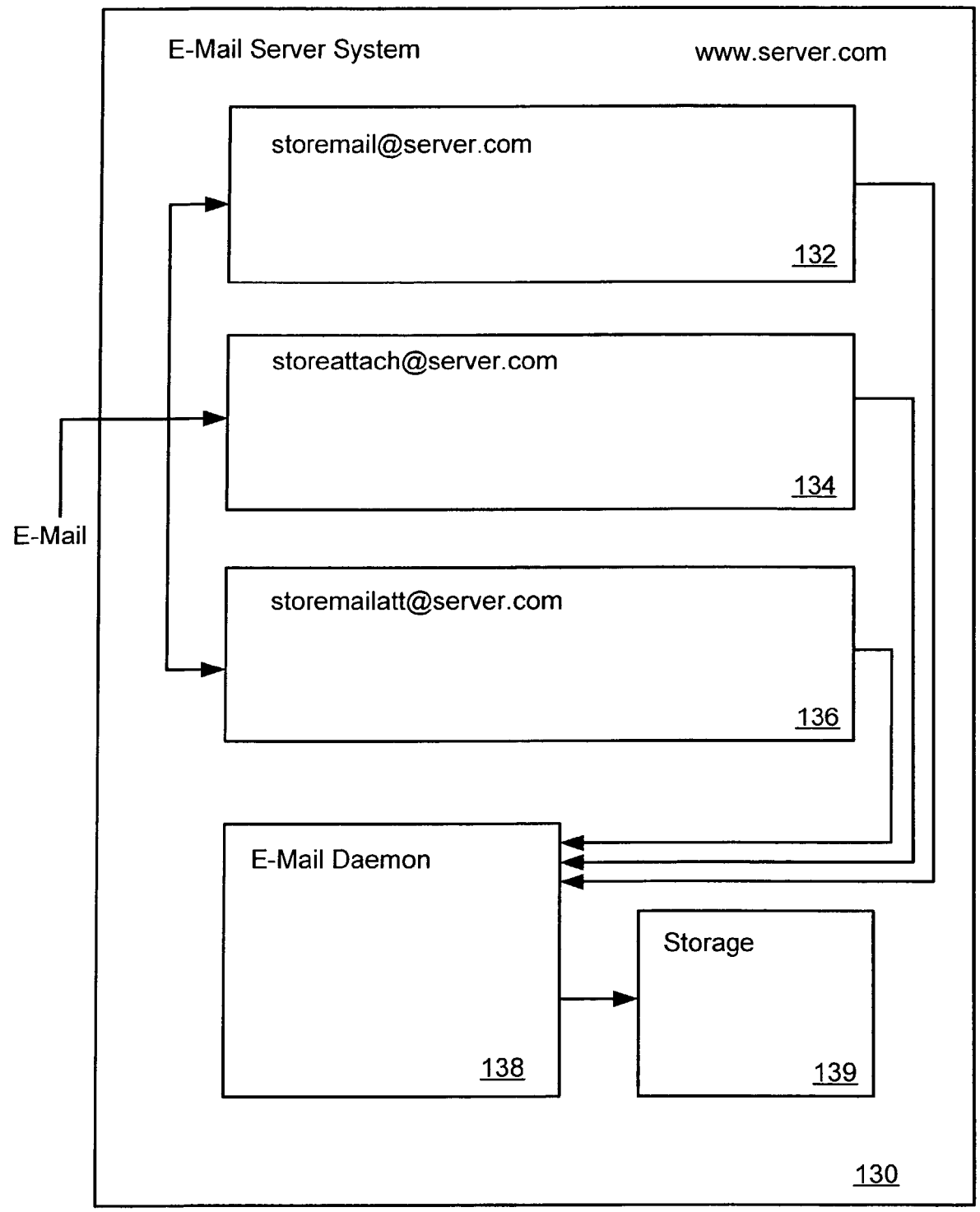
FIG. 3 illustrates a block diagram of particular components of an e-mail server that may be used to carry out various embodiments of the present invention.

The e-mail server 130 of system 100 may, for example, host a computer program, or e-mail daemon, for handling the procedures of this particular embodiment of the present invention. As illustrated in the block diagram of FIG. 3, e-mail server 130 may include one or more e-mail addresses associated with the electronic document storage portion of the present invention. The e-mail server 130 may also host an e-mail daemon 138, or other program, for carrying out the various tasks associated with the automatic e-mail storage embodiment of the present invention. An optional storage device 139 or memory may also be associated with the e-mail server 130 for storing data. Alternatively, e-mail server 130 may include a communication link with a storage device or memory for saving information or data remote from the e-mail server 130. Typically, the e-mail server 130 may be associated with a URL address such as "www.server.com."

As illustrated, the e-mail server may include three e-mail addresses associated with the e-mail server and the automatic document storage system of the present invention. A first e-mail address, "storemail@server.com" 132, may be used for receiving e-mail messages wherein the body of the e-mail is to be saved to a particular location. A second e-mail address, "storeattach@server.com" 134, may be used for receiving e-mail messages wherein any attachments to the received e-mail are to be saved to a particular location. Similarly, a third e-mail address, "storemailatt@server.com" 136, may be assigned to receive and store both the body of an e-mail message and any attachments thereto. Although there are only three e-mail addresses associated with the e-mail server 130 illustrated in FIG. 3, it is understood that the number of e-mail addresses that may be incorporated with this embodiment of the present invention is not limited.

An e-mail received by one of the addresses associated with the e-mail server 130 is passed to an e-mail daemon 138. The e-mail daemon includes the necessary programming or scripts for stripping information from a received e-mail and saving that information to a particular location associated with storage 139 or other storage device. In the case where an e-mail is addressed to "storemail@server.com" 132, the e-mail daemon 138 strips the body of the e-mail from the remainder of the e-mail message and stores the body of the e-mail. Typically, the body of an e-mail is represented by text, thus the body of the e-mail could be saved as a text file. In other instances, the e-mail daemon 138 may recognize the type of information in the body of the e-mail and store the information accordingly. For instance, the e-mail daemon 138 may include programming for recognizing bitmapped images. If the body of the e-mail included a bitmap image, the e-mail daemon 138 could then store the bitmap image in the proper file format.

In those instances where the e-mail daemon 138 saves the attachments of an e-mail to storage 139 or other storage device, the e-mail daemon 138 typically saves the e-mail attachment in the same format as the attachment to the e-mail.

In some instances, the e-mails sent to the various e-mail addresses associated with the automatic document storage system may be saved to a predefined location or locations associated with storage 139. Alternatively, a storage location may be defined within the body of an e-mail, or by some other identifying indicia included with an e-mail message. For example, the subject line of an e-mail may include the path and file name of a storage location for the attachments that a user wishes to store. The attachments to an e-mail could be stored to a particular path and file name by sending an e-mail with the path and file name as the subject line to the e-mail address "storeattach@server.com" 134. Once received, the e-mail and attachments are passed to the e-mail daemon 138 where the information in the subject line would be stripped from the e-mail by the e-mail daemon 138 along with the attachments. The attachments would then be stored by the e-mail daemon 138 to the path and file name retrieved from the subject line by the e-mail daemon 138.

Alternatively, the storage path and location may be defined within the body of the e-mail. A tag line, or identifying indicia, could be included within the e-mail body to identify the storage location for the information being stored. For example, e-mail daemon 138 may search the body of a received e-mail for a predefined tag that notifies the e-mail daemon 138 that the information following the tag is the desired path and filename for storing the attachments to the e-mail. A tag, such as the word "PATH:" in all capital letters and followed by a colon, could be the defining indicia. The path and file name following the tag may be recognized and stripped by the e-mail daemon 138 and used as the path and file name for saving the attachments to the e-mail. For instance, the tag and path name "PATH: \client001\doc001" included in the body of an e-mail instructs an e-mail daemon 138 to store the desired information using the path and filename "\client001\doc001."

In still other instances, separate e-mail addresses associated with particular storage locations could be set-up on e-mail server 130 for receiving and storing e-mail messages and attachments according to the particular e-mail address to which they are addressed. For instance, separate e-mail addresses may be associated with e-mail server 130 for different storage locations. Any e-mail sent to an e-mail address associated with a first storage location would be saved to the first storage location. Similarly, any e-mail sent to an e-mail address associated with a second storage location would be saved in the second storage location. In this manner, multiple storage locations could be defined and information included in e-mail messages could be saved to specific storage locations by including a particular e-mail address as one of the addresses to which an e-mail is being sent.

In yet another embodiment of the present invention, a designated e-mail address may be used to post an e-mail message, an e-mail attachment, or both, to a web page for viewing through the Internet 900 or an intranet.

Similar to the preceding embodiments of the present invention, one or more e-mail addresses may be created and hosted by a computer 110 along with a post daemon 118 for posting information received in e-mail messages to the Internet 900 or an intranet. To post the information to the Internet 900 or an intranet, the information is stored in a specific location that is associated with the Internet 900 or an intranet. The information may be written over pre-existing information or saved as a new file. Once stored, the information may be available for viewing through a web browser surfing the Internet 900 or an intranet.

Figure 4:
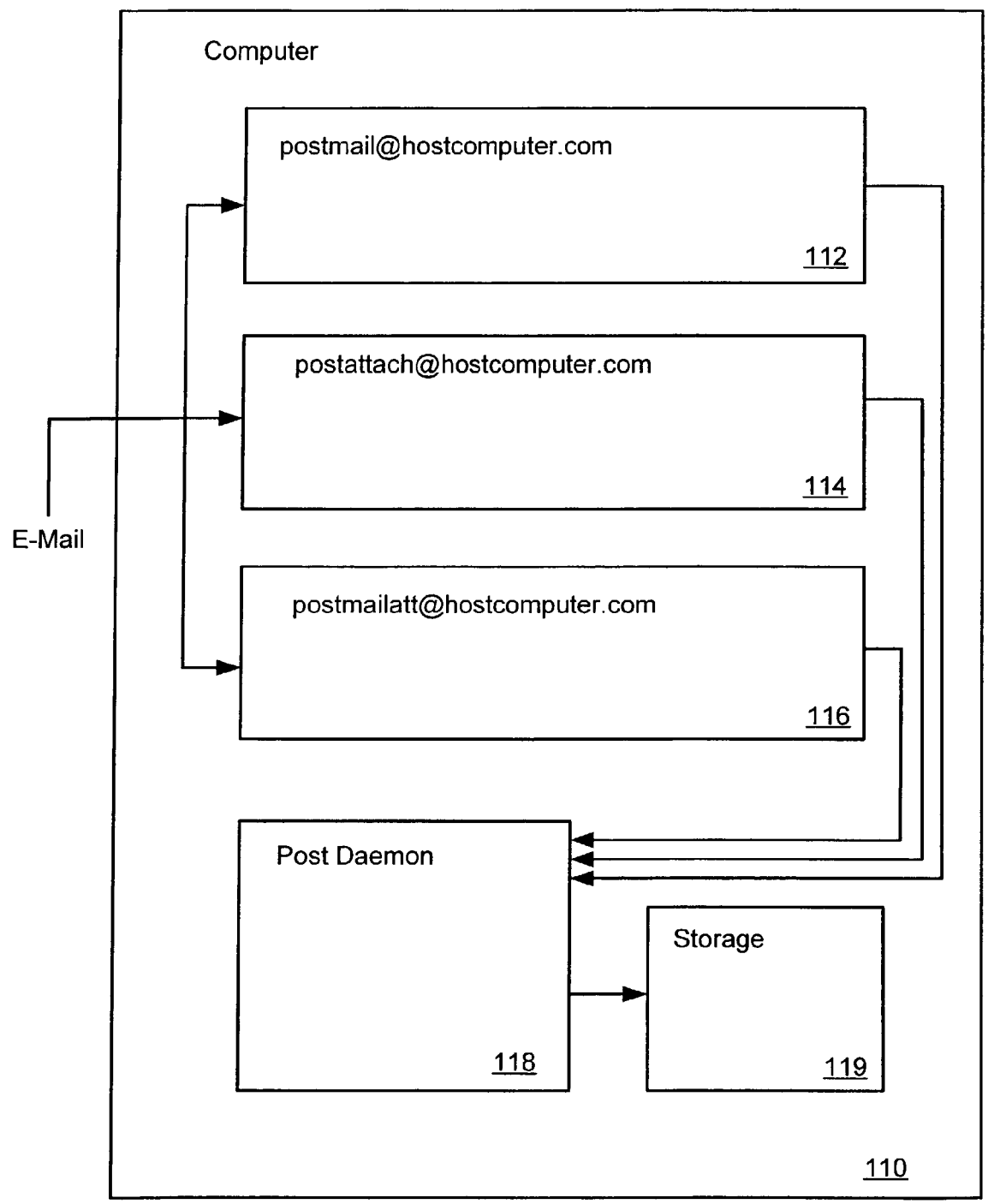
FIG. 4 illustrates a block diagram of particular components of a computer system that may be used to carry out various embodiments of the present invention.

An example of this embodiment of the present invention may be better understood with reference to FIGS. 1 and 4. FIG. 4 illustrates a block diagram of computer 110 including multiple e-mail addresses associated with the posting functions of the present invention. Computer 110 also includes a post daemon 118, or programming, for retrieving information from received e-mails and storing the information to storage 119 where an individual surfing the Internet 900 may retrieve the information.

Although only three e-mail addresses associated with the automatic posting functions of the present invention are illustrated, it is understood that multiple e-mail addresses may be associated with this embodiment of the present invention. As illustrated, a first e-mail address, "postmail@hostcomputer.com" 112, may be used to post the body of an e-mail to a storage 119 accessible through the Internet 900. A second e-mail address, "postattach@hostcomputer.com" 114, may be used to post the attachments of an e-mail to a storage 119 accessible through the Internet 900. Similarly, a third e-mail address, "postmailatt@hostcomputer.com" 116, may be used to post both the body of the e-mail and the attachments to a storage 119 accessible to Internet 900 browsers.

Once an e-mail is received, it is passed to the post daemon 118 where the particular information for posting is stripped from the e-mail and saved to a location accessible to the Internet 900. For instance, if the body of an e-mail is to be posted to the Internet 900, the e-mail may be sent to the e-mail address "postmail@hostcomputer.com." The received e-mail is passed to post daemon 118 where the body of the e-mail is stripped from the remaining information associated with the e-mail. The post daemon 118 saves the body of the e-mail to a storage 19 that is accessible via the Internet 900.

The post daemon 118 may save the information being posted to one of a number of locations. The post daemon 118 may save the information to a predefined location such as a location associated with the particular e-mail address to which the e-mail was sent. Alternatively, the post daemon 118 may strip the storage path and filename from the subject line of the e-mail. In other instances, the path and filename for storing the information to be posted may be determined by the post daemon 118 from a tag and path information included in the body of an e-mail in a similar manner used by the e-mail daemon 138 of the previously described embodiment of the present invention.

Typically, any information saved by the post daemon 118 is saved over an existing file that is already associated with the Internet 900. For instance, a home page associated with the URL "www.hostcomputer.com" may be saved in storage 119 as "homepage.html" and accessible to the Internet 900. A user of remote computer 810 may be able to access the information saved as the home page using a web browser connected to the Internet 900. If the information on the home page becomes outdated, or is need of updating, a new home page may be posted by sending an e-mail with an attachment to the post daemon 118 associated with the present invention, where the attachment is the updated home page file. An e-mail with a file attachment representing the new or updated home page may be sent to the e-mail address "postattach@hostcomputer.com" 114 to change the home page. Once received, the post daemon 18 strips the attachment from the e-mail and saves the attachment as "homepage.htm" in storage 119. Once saved, any Internet 900 link associated with the "homepage.htm" file stored by storage 119 will pull up the new home page when accessed or selected.

Although the post daemon 118 usually saves information over pre-existing files, the post daemon 118 may also create and save information to new files. For example, a new home page sent to the post daemon 118 for posting to a storage 119 accessible to the Internet 900 may also include new links to files or storage locations that do not exist. Additional attachments could be included with the e-mail used for updating the home page wherein the additional attachments would be associated with the new links in the updated home page. The additional attachment would also be saved by the post daemon 118 to a storage 119 accessible to the Internet 900, thereby preserving the integrity of the new home page links.

In those instances where the information stripped from an e-mail for posting by post daemon 118 are not in an Internet compatible format, the post daemon 118 may convert the information into a format that may be used with the Internet. For instance, if a user desires to post the body of an e-mail to an Internet available file, the body of the e-mail may only include text. The post daemon 118 may analyze the body of the e-mail and determine that the text is not in a format that may be viewed over the Internet. The post daemon 118 may add coding, such as a markup language, that will convert the text message into a message that may be displayed by the Internet.

Another embodiment of the present invention involves the use of an intermediary program for managing documents to send a document to a desired e-mail address, to a printer to be printed, to a storage device for storage, or to a storage device for posting as a web page viewable through the Internet 900 or an intranet.

The intermediary program may include a stand-alone program for manipulating or managing documents, or may be a program, or plug-in, associated with a pre-existing program typically used to compose, send, store, and receive e-mail. For instance, a web-based driver may be used to carry out the various functions of this embodiment of the present invention.

In a particular embodiment, the intermediary program operates with a pre-existing program for creating, sending, receiving, and storing e-mails. The intermediary program provides a user with selectable options for facilitating the printing, saving, or posting of a particular e-mail, attachments to the e-mail, or both the e-mail body and the attachments to the e-mail. Once the creation of an e-mail is completed, the intermediary program may be run to obtain instructions from the user for managing the e-mail. Specifically, the intermediary program may be used to select the desired print, save, and posting capabilities of the present invention. Use of the intermediary program creates a user-friendly environment because particular e-mail addresses for accomplishing such tasks need not be memorized. The use of the intermediary program is especially valuable in enterprise situations where hundreds of e-mail addresses may be used to print, save, or post e-mails and e-mail attachments.

Figure 5:
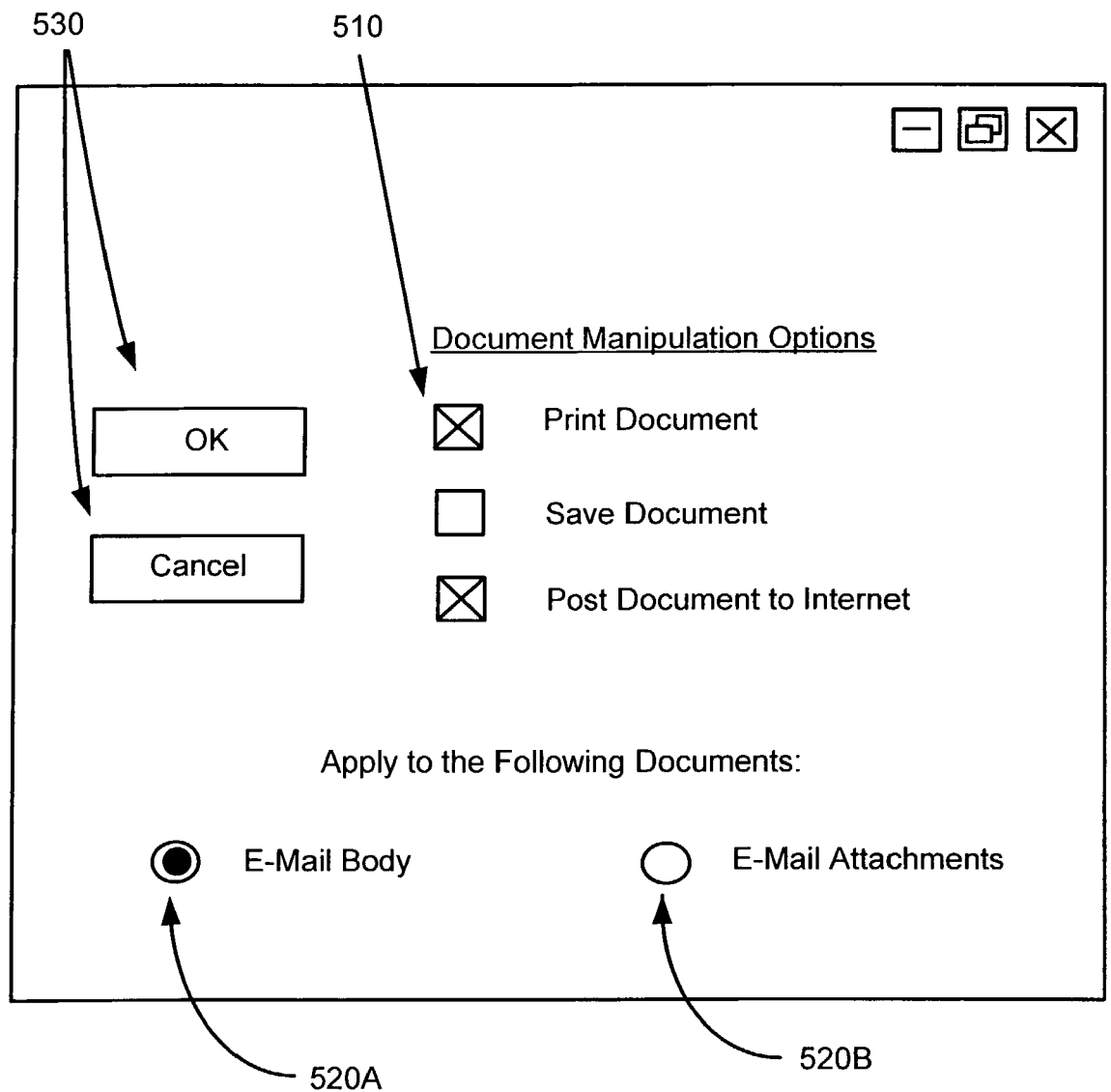
FIG. 5 illustrates one embodiment of a selection screen for allowing a user to execute various functions of the present invention.

Typically, once an e-mail is created and any attachments are attached thereto, the e-mail is sent by selecting a "Send" button or other executable function associated with the program used to create the e-mail. In those instances where the present invention is incorporated with the e-mail system, an intermediary program may be instructed to appear upon the selection of the "Send" function of the e-mail program. Instead of immediately sending the e-mail, the intermediary program may offer the user various selections for manipulating or managing the e-mail. For instance, an example screen of the intermediary program is illustrated in FIG. 5. The intermediary program may present such a screen, thereby allowing a user to use the various embodiments of the present invention without memorizing the e-mail addresses associated therewith.

As illustrated in FIG. 5, the intermediary program presents a number of options for the user. A user may select Document Manipulation Options by selecting the selection boxes 510 appearing next to each option. Similarly, a user may select the Documents to which to apply the Document Manipulation Options by selecting the selection circles 520 associated with the available documents. For example, if a user wished to apply the Document Manipulation Options to just the e-mail body, the selection circle 520A associated with that option could be selected as illustrated. If the Document Manipulation Options are to be applied to both the body of the e-mail and the attachments to the e-mail, both selection circles 520A and 520B may be selected. An execution button 530 may be selected by the user once the desired Document Manipulation Options and Documents are selected. The execution button 530 causes the intermediary program to send the e-mail to the desired addresses and to the daemons for carrying out the selected Document Manipulation Options or to just send the e-mail. It is understood that the layout of the user options, and combinations offered to a user may vary.

Additional information may also be entered or submitted to the intermediary program by a user. For instance, upon selecting the Document Management Option associated with the saving of the e-mail and/or any attachments thereto, the intermediary program may prompt the user to enter the path and file name to which the e-mail and/or attachments should be saved. If such options are available, a user would not have to use the Subject line or tags to define the path and file name for saving an e-mail and/or associated attachments.

In an alternate embodiment the intermediary program may be turned on or off such that when it was on, the intermediary program offers a user the document management options before sending the e-mail. When turned off, the e-mail program would send an e-mail without first executing the intermediary program.

Having thus described certain preferred embodiments of the present invention, it is to be understood that the invention defined by the appended claims is not to be limited by particular details set forth in the above description, as many apparent variations thereof are possible without departing from the spirit or scope thereof as hereinafter claimed.

What is claimed is:

1. A method for managing e-mail, comprising:
providing at least one particular e-mail address associated with a device for receiving e-mail, the device being associated with a plurality of e-mail addresses wherein each e-mail address is associated with a different daemon provided by the device and each daemon is configured to manipulate an e-mail in a particular manner;
providing a daemon associated with said at least one particular e-mail address for automatically saving at least a portion of an e-mail received by said at least particular one e-mail address associated with said device to a storage location from which the portion can be viewed over the Internet; and
automatically saving, using said daemon associated with said at least one particular e-mail address, at least the portion of said e-mail to the storage location in the particular manner of said daemon associated with said at least one particular e-mail address.

2. The method according to claim 1, wherein said automatically saving at least the portion of said e-mail comprises saving at least one attachment to said e-mail as a file in said storage location where that file is associated with an URL.

3. The method according to claim 1, wherein said providing a daemon for automatically saving at least a portion of said e-mail comprises providing a daemon for posting one or both of a body portion and an attachment portion of said e-mail to a storage location from which the posted portion or portions can be viewed over the Internet.

4. A method for manipulating an e-mail message, comprising:
composing an e-mail message;
addressing said e-mail message to an e-mail address corresponding to a device, the device being associated with a plurality of e-mail addresses wherein each e-mail address is associated with a different daemon provided by the device and each daemon is configured to manipulate an e-mail in a particular manner and configured to save at least a portion of said e-mail message to a storage location from which the said portion can be viewed over the Internet;
sending said e-mail message to said e-mail address corresponding to said device;
receiving said e-mail message at said e-mail address corresponding to said device; and
automatically saving, using a daemon associated with said e-mail address, the portion of said e-mail to a storage location in the particular manner of the daemon associated with said e-mail address from which the portion can be viewed over the Internet.

5. The method according to claim 4, wherein automatically saving comprises saving at least one attachment to said e-mail as a file in said storage location where that file is associated with an URL.

6. A system for manipulating an e-mail message, comprising:
a device capable of receiving an e-mail, the device being associated with a plurality of e-mail addresses wherein each e-mail address is associated with a different daemon provided by the device and each daemon is configured to manipulate an e-mail in a particular manner;
at least one particular e-mail address associated with said device; and
a daemon associated with the at least one particular e-mail address and stored in a memory of said device for automatically saving at least a portion of an e-mail received by said at least one particular e-mail address associated with said device to a storage location in the particular manner of said daemon associated with said at least one particular e-mail address from which the portion can be viewed over the Internet.

7. The system according to claim 6, wherein said daemon stored in a memory of said device comprises a daemon for automatically saving at least one attachment to said e-mail as a file in said storage location where that file is associated with an URL.

8. A non-transitory computer readable medium having computer readable instructions that when executed cause a device to implement a method that includes:
receiving an e-mail at a particular e-mail address associated with the device, the device being associated with a plurality of e-mail addresses wherein each e-mail address is associated with a different daemon provided by the device and each daemon is configured to manipulate an e-mail in a particular manner; and automatically saving, using a daemon associated with said particular e-mail address, at least a portion of the e-mail to a storage location in the particular manner of the daemon associated with said particular e-mail address from which the portion can be viewed over the Internet.

9. The non-transitory computer readable medium of claim 8, wherein automatically saving at least the portion of the e-mail comprises saving at least one attachment to said e-mail as a file in said storage location where that file is associated with an URL.

10. The non-transitory computer readable medium of claim 8, wherein automatically saving at least the portion of the e-mail comprises posting one or both of a body portion and an attachment portion of the e-mail to a storage location from which the posted portion or portions can be view for viewed over the Internet.

11. A method for managing e-mail, comprising:

receiving an e-mail at a particular e-mail address associate with a device, the device being associated with a plurality of e-mail addresses wherein each e-mail address is associated with a different daemon provided by the device and each daemon is configured to manipulate an e-mail in a particular manner; and using the daemon associated with the particular e-mail address to store at least a portion of the email to a storage location in the particular manner of that daemon.

12. The method of claim 11 wherein using the daemon comprises using the daemon associated with the particular e-mail address to save at least the portion of the e-mail to a storage location from which the portion can be viewed over the Internet.

13. The method of claim 12 wherein using the daemon comprises using the daemon associated with the particular e-mail address to save an attachment portion of the e-mail as a file in the storage location where that file is associated with an URL.

* * * * *